(12) United States Patent
Terakawa et al.

(10) Patent No.: US 6,965,207 B2
(45) Date of Patent: Nov. 15, 2005

(54) POWER WINDOW APPARATUS

(75) Inventors: Katsutoshi Terakawa, Niwa-gun (JP); Satoshi Sugimoto, Niwa-gun (JP); Tomohiro Igawa, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/844,205

(22) Filed: May 12, 2004

(65) Prior Publication Data

US 2004/0227478 A1    Nov. 18, 2004

(30) Foreign Application Priority Data

May 13, 2003  (JP) ............................. 2003-134467

(51) Int. Cl.[7] .............................................. G05B 5/00
(52) U.S. Cl. ..................... 318/445; 318/466; 318/443; 318/282; 49/26; 49/28
(58) Field of Search ................. 318/466, 468, 318/443, 445, 282, 286, 446, 449, 293; 49/26, 49/28; 160/130, 293, 310

(56) References Cited

U.S. PATENT DOCUMENTS

| | | | | |
|---|---|---|---|---|
| 6,031,296 A | * | 2/2000 | Takagi et al. | ............... 307/10.1 |
| 6,072,290 A | * | 6/2000 | Takagi et al. | ............... 318/283 |
| 6,531,840 B2 | * | 3/2003 | Sugawara | ............... 318/445 |
| 6,563,279 B2 | * | 5/2003 | Sugawara | ............... 318/443 |
| 6,690,131 B1 | * | 2/2004 | Shimomura et al. | ........ 318/445 |
| 6,724,164 B2 | * | 4/2004 | Shimizu et al. | ............. 318/282 |

FOREIGN PATENT DOCUMENTS

JP       2002-013964      1/2002

* cited by examiner

*Primary Examiner*—David Martin
*Assistant Examiner*—Erick Glass
(74) *Attorney, Agent, or Firm*—Synnestvedt & Lechner LLP

(57) ABSTRACT

A power window apparatus includes an operation switch for causing a window glass to move when operated. The operation switch generates an input signal having a ground level when operated. A microcomputer drives a motor in response to an input signal. A down terminal and an up terminal are used to connect the operation switch and the microcomputer to each other. A ground terminal is used to connect the operation switch and ground to each other. A battery terminal is used to connect the operation switch and a power supply to each other. When operated, the operation switch connects the down terminal or the up terminal to the ground terminal and generates an input signal having the ground level in the down terminal or the up terminal. When not operated, the operation switch connects the down terminal and the up terminal to the power supply terminal.

6 Claims, 4 Drawing Sheets

POWER WINDOW APPARATUS

BACKGROUND OF THE INVENTION

The present invention relates to a power window apparatus, and more particularly, to a control to open and close a window glass.

In recent years, various motors have been mounted on vehicles to improve convenience. For example, a power window apparatus, which raises and lowers a window glass with a direct current (DC) motor, is mounted on many vehicles. In the power window apparatus, an operation switch is first operated by an operator, so that a motor electronic control unit (motor ECU), which is electrically connected to the operation switch, controls the motor according to an input signal from the operation switch. Torque produced by the motor is then transmitted to the window glass via a mechanical structure, to raise or lower the window glass.

In such a power window apparatus, a board on which the motor ECU is mounted (motor controller) may have a waterproof structure shown, for example, in Japanese Laid-Open Patent Publication No. 2002-13964, to prevent water entry when the vehicle is submerged in water.

In some power window apparatus, a board, on which an operation switch (switch unit) is mounted, and a motor controller are connected via a connector. In a power window apparatus where the connector is arranged on the board of the switch unit, however, the connected parts of the connector and the switch unit often do not have a waterproof structure. If this power window apparatus is submerged in water, water enters into the connected parts of the connector and the switch unit. Such water entry causes leakage current to flow between terminals of the connector. The leakage current may cause the motor ECU to incorrectly recognize its input signal. Particularly, when the motor ECU drives the motor to raise or lower the window glass in response to a low-level input signal (active-low control), the motor ECU may incorrectly recognize its input signal due to water entry.

FIG. 1 shows a conventional power window apparatus 50. The power window apparatus 50 includes a switch unit 52, which has an operation switch 51, and a motor controller 53. The switch unit 52 and the motor controller 53 are connected by a wire harness 54 via a connector (not shown). The operation switch 51 includes a lowering switch 55 and a raising switch 56. When, for example, the driver operates the operation switch 51 to lower a window glass, the lowering switch 55 is closed and a down terminal 57 is electrically connected to a ground terminal 58. This electrical connection causes the operation switch 51 to output an input signal V1 having a ground level (low-level) from the down terminal 57. A microcomputer 59 included in the motor controller 53 detects the state of the lowering switch 55 based on an input signal V1 provided via another down terminal 60. When the input signal V1 is at ground level, the motor controller 53 actuates a driver circuit 61 to drive a motor M. In this way, in the power window apparatus 50, the microcomputer 59 executes active-low control over the motor M. To maintain input signals V1 and V2 at a high-level when the operation switch 51 is not operated, a pull-up resistor R1 is connected between the down terminal 60 and a power supply V0, and a pull-up resistor R2 is connected between an up terminal 62 and the power supply Vo.

When the power window apparatus 50 is submerged in water, water enters into the connected parts of the connector and the switch unit 52. This may cause leakage current to flow between, for example, the down terminal 57 and the ground terminal 58 of the switch unit 52. The resistance of a leakage resistor RL10 between the two terminals is smaller than the resistance of the pull-up resistor R1. Therefore, the microcomputer 59 detects a low-level input signal V1 like when the lowering switch 55 is closed. This causes the microcomputer 59 to incorrectly recognize that the lowering switch 55 is in a closed state when the operation switch 51 is not operated.

SUMMARY OF THE INVENTION

The present invention provides a power window apparatus that prevents the operation state of a switch from being incorrectly recognized when submerged in water.

The present invention provides a power window apparatus for connection to a power supply and ground, for driving an actuator that is used to move a window glass. The power window apparatus includes a switch for causing the window glass to move when operated. The switch generates a switch signal having a ground level when operated. A control unit drives the actuator in response to the switch signal having the ground level. A connecting terminal is used to connect the switch and the control unit to each other. A ground terminal is used to connect the switch and ground to each other. A power supply terminal is used to connect the switch and the power supply to each other. When operated, the switch connects the connecting terminal and the ground terminal to each other and generates the switch signal having the ground level in the connecting terminal. When not operated, the switch connects the connecting terminal and the power supply terminal to each other.

A further aspect of the present invention is a power window apparatus for connection to a power supply and ground, for driving an actuator that is used to move a widow glass. The power window apparatus includes a switch for causing the window glass to move when operated. The switch generates a switch signal having a power supply level when operated. A control unit drives the actuator in response to the switch signal having the power supply level. A connecting terminal is used to connect the switch and the control unit to each other. A power supply terminal is used to connect the switch and the power supply to each other. A ground terminal is used to connect the switch and ground to each other. When operated, the switch connects the connecting terminal and the power supply terminal to each other and generates the switch signal having the power supply level in the connecting terminal. When not operated, the switch connects the connecting terminal and the ground terminal to each other.

A further aspect of the present invention is a power window apparatus for connection to a power supply and ground, for driving an actuator that is used to raise and lower a widow glass. The power window apparatus includes a raising switch for causing the window glass to raise when operated. The raising switch generates a first switch signal having a ground level when operated. A lowering switch causes the window glass to lower when operated. The lowering switch generates a second switch signal having a ground level when operated. A control unit drives the actuator in response to the first switch signal or the second switch signal. A first terminal is used to connect the raising switch and the control unit to each other. A second terminal is used to connect the lowering switch and the control unit to each other. A ground terminal is used to connect the raising switch and the lowering switch to ground. A power supply terminal is used to connect the raising switch and the lowering switch to the power supply. When operated, the raising switch connects the first terminal and the ground terminal to each other and generates the first switch signal having the ground level in the first terminal. When not operated, the raising switch connects the first terminal and the power supply terminal to each other. When operated, the lowering switch connects the second terminal and the ground terminal to each other and generates the second switch signal having the ground level in the second terminal. When not operated, the lowering switch connects the second terminal and the power supply terminal to each other.

A further aspect of the present invention is a power window apparatus for connection to a power supply and ground, for driving an actuator that is used to raise and lower a window glass. The power window apparatus includes a raising switch for causing the window glass to raise when operated. The raising switch generates a first switch signal having a power supply level when operated. A lowering switch causes the window glass to lower when operated. The lowering switch generates a second switch signal having the power supply level when operated. A control unit drives the actuator in response to the first switch signal or the second switch signal. A first terminal is used to connect the raising switch and the control unit to each other. A second terminal is used to connect the lowering switch and the control unit to each other. A power supply terminal is used to connect the raising switch and the lowering switch to the power supply. A ground terminal is used to connect the raising switch and the lowering switch to ground. When operated, the raising switch connects the first terminal and the power supply terminal to each other and generates the first switch signal having the power supply level in the first terminal. When not operated, the raising switch connects the first terminal and the ground terminal to each other. When operated, the lowering switch connects the second terminal and the power supply terminal to each other and generates the second switch signal having the power supply level in the second terminal. When not operated, the lowering switch connects the second terminal and the ground terminal to each other.

A further aspect of the present invention is a method for maintaining a switch signal generated by a switch at a ground level or a power supply level in a power window apparatus that includes the switch, which causes a window glass to move when operated. The power window apparatus includes a control unit for driving an actuator to move the window glass in response to a switch signal having a ground level, a connecting terminal connected to the control unit, a ground terminal connected to the ground, and a power supply terminal connected to a power supply. The method includes connecting the connecting terminal and the ground terminal to each other and generating a switch signal having the ground level in the connecting terminal when the switch is operated, and connecting the connecting terminal and the power supply terminal to each other and generating a switch signal having the power supply level in the connecting terminal when the switch is not operated.

A further aspect of the present invention is a method for maintaining a switch signal generated by a switch at a ground level or a power supply level in a power window apparatus that includes the switch, which causes a window glass to move when operated. The power window apparatus includes a control unit for driving an actuator to move the window glass in response to a switch signal having the power supply level, a connecting terminal connected to the control unit, a ground terminal connected to ground, and a power supply terminal connected to a power supply. The method includes connecting the connecting terminal and the power supply terminal to each other and generating a switch signal having the power supply level in the connecting terminal when the switch is operated, and connecting the connecting terminal and the ground terminal to each other and generating a switch signal having the ground level in the connecting terminal when the switch is not operated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
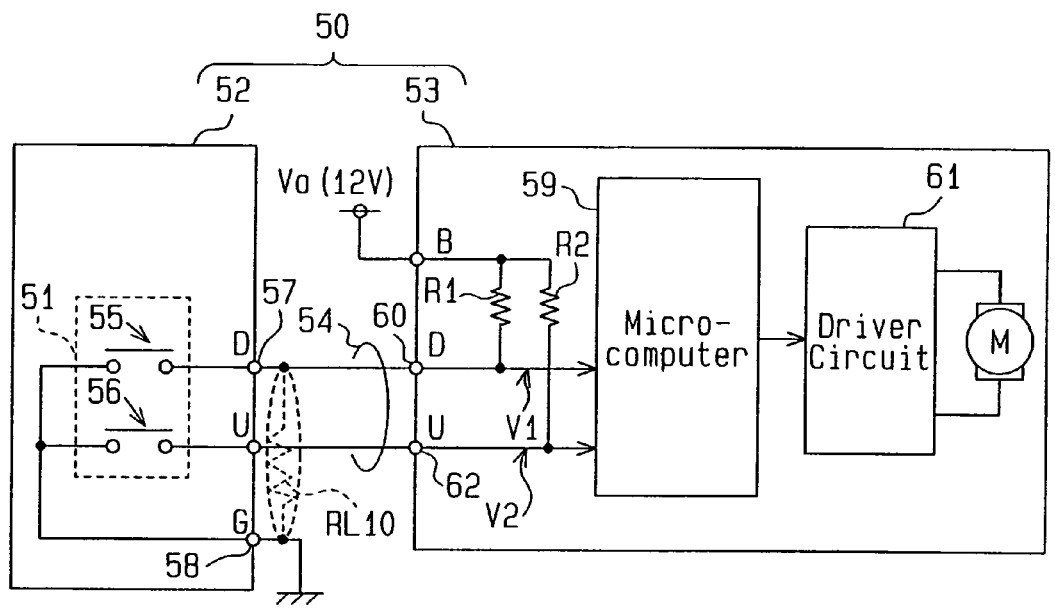
FIG. 1 is a schematic block diagram of a conventional power window apparatus.

In the drawings, like numerals are used for like elements throughout.

A power window apparatus 1 according to a preferred embodiment of the present invention will now be described with reference to FIGS. 2 to 6.

Figure 2:
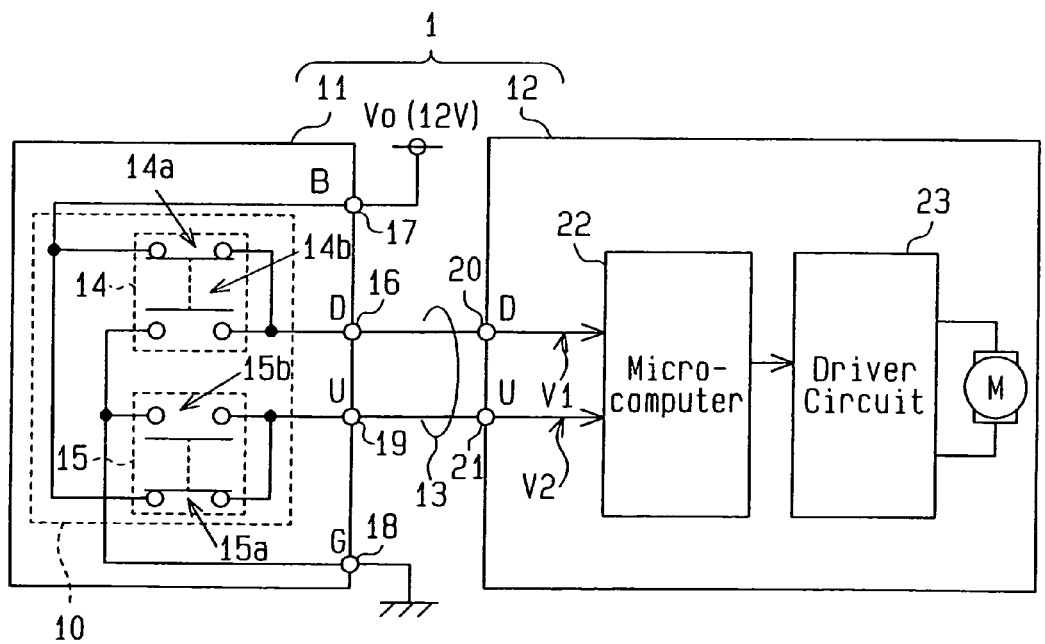
FIG. 2 is a schematic block diagram of a power window apparatus according to a preferred embodiment of the present invention.

As shown in FIG. 2, the power window apparatus 1 includes a switch device 11, which has an operation switch 10, and a motor controller 12, which has a waterproof structure. The switch device 11 and the motor controller 12 are connected by a wire harness 13 via a connector (not shown).

The operation switch 10 includes a lowering switch 14 and a raising switch 15. The lowering switch 14 is a transfer contact-type switch connected between three terminals, namely, a down terminal 16, a battery terminal 17, and a ground terminal 18. The lowering switch 14 connects either the battery terminal 17 or the ground terminal 18 to the down terminal 16. In more detail, the lowering switch 14 includes a first switch unit 14a connected between the down terminal 16 and the battery terminal 17, and a second switch unit 14b connected between the down terminal 16 and the ground terminal 18. The first switch unit 14a and the second switch unit 14b operate in a manner complementary to each other. When the operation switch 10 is not operated, the first switch unit 14a is closed and the second switch unit 14b is opened. When, for example, the driver operates the operation switch 10 to lower a window glass, the first switch unit 14a is opened and the second switch unit 14b is closed. For ease of explanation, the state where the first switch unit 14a is closed is hereafter referred to as the lowering switch 14 is in an "opened state", and the state where the second switch unit 14b is closed is hereafter referred to as the lowering switch 14 is in a "closed state". In the preferred embodiment, the battery terminal 17 is connected to a power supply Vo (12V) and the ground terminal 18 is grounded.

The raising switch 15 is a transfer contact-type switch connected between three terminals, namely, an up terminal 19, the battery terminal 17, and the ground terminal 18. The raising switch 15 connects either the battery terminal 17 or the ground terminal 18 to the up terminal 19. In more detail, the raising switch 15 includes a third switch unit 15a connected between the up terminal 19 and the battery terminal 17, and a fourth switch unit 15b connected between the up terminal 19 and the ground terminal 18. The third switch unit 15a and the fourth switch unit 15b operate in a manner complementary to each other. When the operation switch 10 is not operated, the third switch unit 15a is closed and the fourth switch unit 15b is opened. When, for example, the driver operates the operation switch 10 to raise the window glass, the third switch unit 15a is opened and the fourth switch unit 15b is closed. For ease of explanation, the state where the third switch unit 15a is closed is hereafter referred to as the raising switch 15 being in an "opened state", and the state where the fourth switch unit 15b is closed is hereafter referred to as the raising switch 15 being in a "closed state".

In the operation switch 10, either the lowering switch 14 or the raising switch 15 is closed by operating a button (not shown). The down terminal 16 connects to the ground terminal 18 via the closed second switch unit 14b. The up terminal 19 connects to the ground terminal 18 via the closed fourth switch unit 15b.

Figure 3:
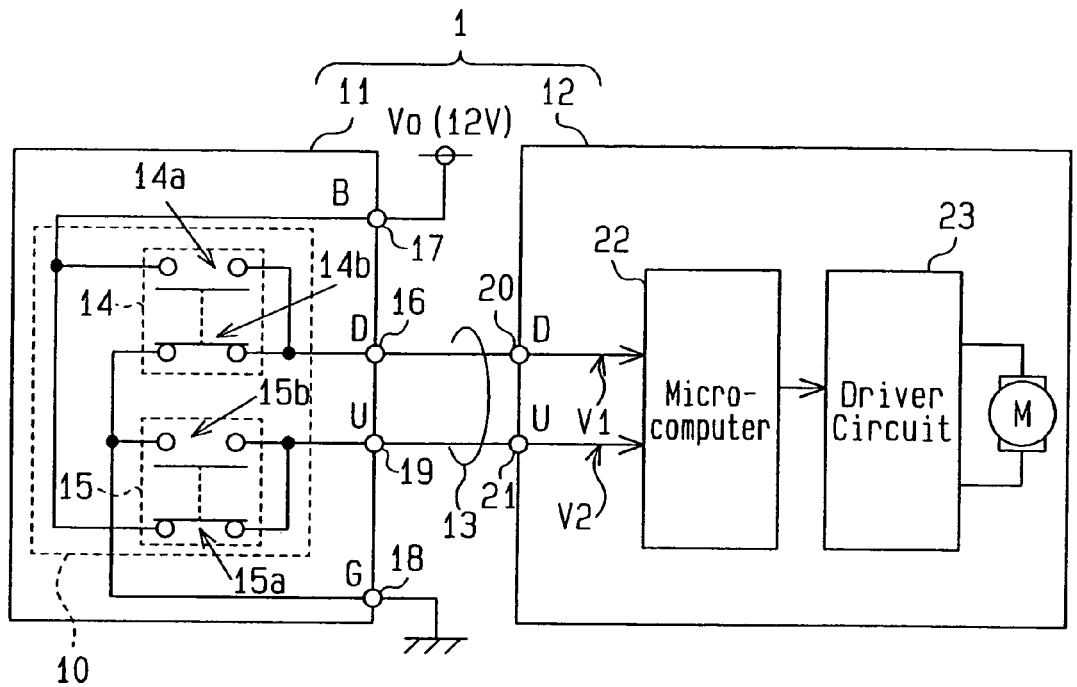
FIG. 3 is a schematic block diagram explaining the operation of the power window apparatus of FIG. 2.

When the driver operates the operation switch 10 to lower the window glass, the lowering switch 14 enters the closed state as shown in FIG. 3 and the down terminal 16 connects to the ground terminal 18.

The switch device 11 is connected to the motor controller 12 via the wire harness 13. In more detail, the down terminal 16 and the up terminal 19 of the switch device 11 are respectively connected to a down terminal 20 and an up terminal 21 of the motor controller 12 via a cable of the wire harness 13.

The motor controller 12 includes a microcomputer 22, a motor M, and a driver circuit 23. The motor M functions as an actuator for raising or lowering the window glass. The driver circuit 23 drives the motor M according to an instruction given by the microcomputer 22. The down terminal 20 and the up terminal 21 are electrically connected to the microcomputer 22.

The microcomputer 22 actuates the driver circuit 23 according to input signals V1 and V2. In more detail, the microcomputer 22 actuates the driver circuit 23 to rotate the motor M clockwise when the potential level at the down terminal 20 is less than or equal to an actuation threshold Von. The microcomputer 22 does not actuate the driver circuit 23 when the potential level at the down terminal 20 is greater than or equal to a non-actuation threshold Voff (non-actuation threshold Voff>actuation threshold Von: see FIG. 6). In the same manner, the microcomputer 22 actuates the driver circuit 23 to rotate the motor M counterclockwise when the potential level at the up terminal 21 is less than or equal to the actuation threshold Von. The microcomputer 22 does not actuate the driver circuit 23 when the potential level at the up terminal 21 is greater than or equal to the non-actuation threshold Voff. In this way, the microcomputer 22 executes active-low control over the motor M according to the level of the input signals V1 and V2.

Figure 4:
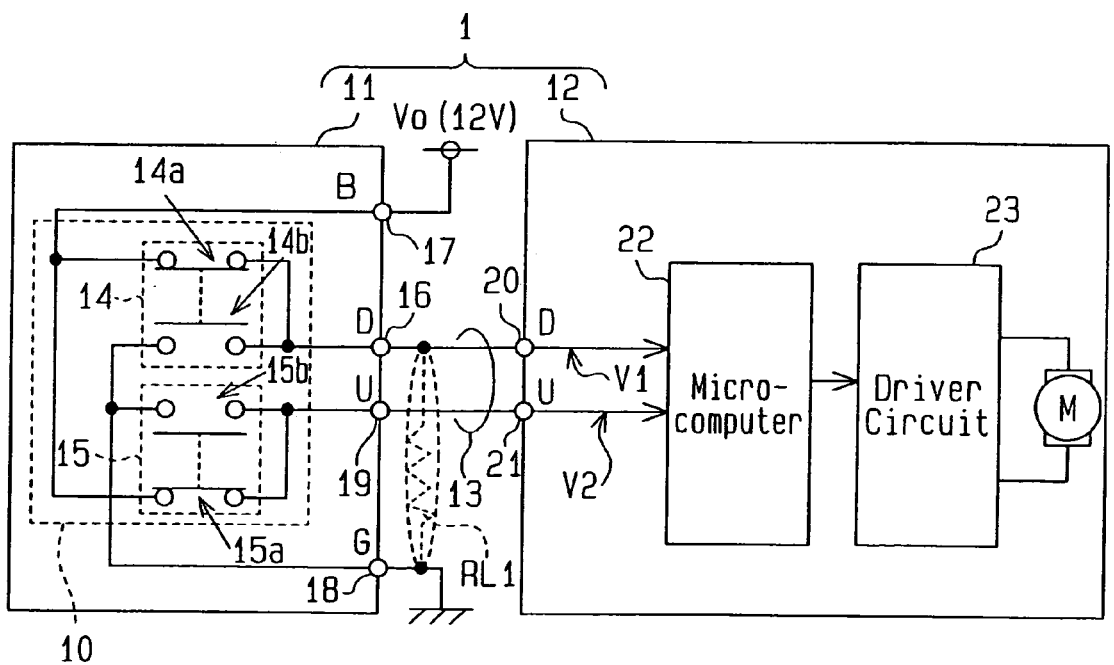
FIG. 4 is a schematic block diagram explaining the operation of the power window apparatus of FIG. 2 submerged in water.
Figure 5:
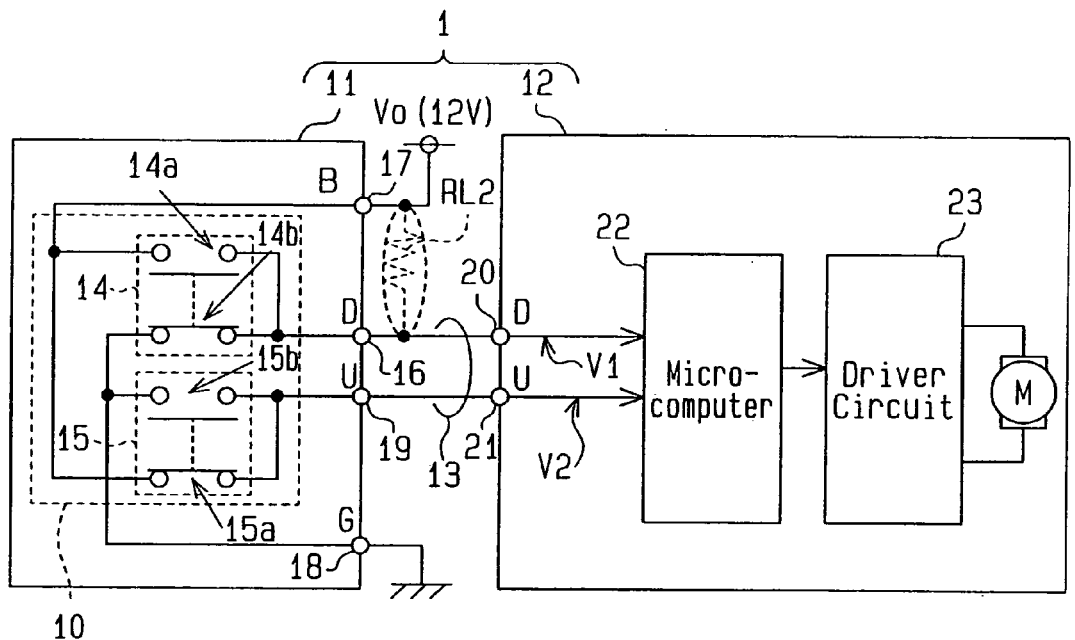
FIG. 5 is a schematic block diagram explaining the operation of the power window apparatus of FIG. 2 submerged in water.
Figure 6:
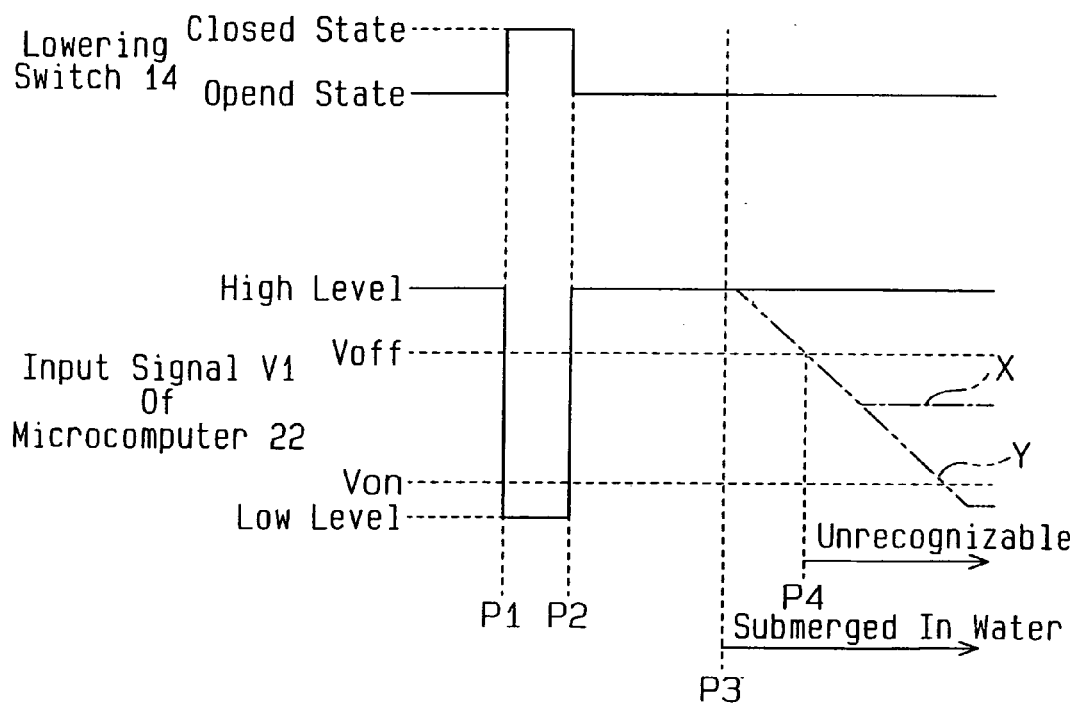
FIG. 6 is a graph explaining the operation state of the power window apparatus of FIG. 2 submerged in water.

The following describes a case in which the vehicle having the power window apparatus 1 with the above-described structure is, for example, submerged in water, with reference to FIGS. 4 to 6. The lowering switch 14 and the raising switch 15 have the same structure, with the only difference being in the control executed by the microcomputer 22 (to raise or lower the window glass). The following only describes a case in which the operation switch 10 is operated to lower the window glass.

When the vehicle is not submerged in water, the input signal V1 of the microcomputer 22 is normally held at a high-level (power supply Vo level). As shown in FIG. 6, when the lowering switch 14 is closed by operating the operation switch 10 at the timing indicated by point P1, the input signal V1 shifts to a low-level (ground level). The microcomputer 22 actuates the motor M according to the low-level input signal V1. When the lowering switch 14 is then opened by stopping the operation of the operation switch 10 at the timing indicated by point P2, the input signal V1 returns to the high-level. The microcomputer 22 stops the motor M according to the high-level input signal V1.

When the vehicle is submerged in water at the timing indicated by point P3, water enters into each terminal of the connector, and leakage current flows between the down terminal 16 and the ground terminal 18. When the operation switch 10 is not operated (FIG. 4), the first switch unit 14a of the lowering switch 14 is closed and the down terminal 16 is connected to the battery terminal 17. A voltage value of the down terminal 16 is obtained by dividing the voltage of the power supply Vo by a ratio of the resistance between the battery terminal 17 and the down terminal 16 to the resistance of a leakage resistor RL1 between the down terminal 16 and the ground terminal 18. Because the resistance of the leakage resistor RL1 is generally far greater than the resistance between the battery terminal 17 and the down terminal 16, the down terminal 16 is set at a high-level. Even at the time of water entry, therefore, the microcomputer 22 is provided with a high-level input signal V1 when the operation switch 10 is not operated. The microcomputer 22 determines that the lowering switch 14 is in an opened state, and does not actuate the motor M.

When the conventional power window apparatus 50 shown in FIG. 1 is submerged in water, leakage current flows between the down terminal 57 and the ground terminal 58. The level of the input signal V1 is lowered according to the leakage resistor RL10 between the down terminal 57 and the ground terminal 58 as indicated by the dash-dot line X or the dash-dot-dot line Y in FIG. 6. When the level of the input signal V1 falls between the actuation threshold Von and the non-actuation threshold Voff as indicated by the dash-dot line X after the time indicated by point P4, the microcomputer 59 cannot recognize the opened or closed state of the lowering switch 55. When the level of the input signal V1 is below the actuation threshold Von as indicated by the dash-dot-dot line Y, the microcomputer 59 incorrectly recognizes that the lowering switch 55 is in the closed state although the lowering switch 55 is actually in the opened state.

The following describes a case in which the operation switch 10 is operated at the time of water entry with reference to FIG. 5. Assuming that the lowering switch 14 is closed by operating the operation switch 10 at the time of water entry, the on-resistance of the lowering switch 14 in a closed state is far smaller than the resistance of the leakage resistor RL2. Thus, the potential level of the down terminal 16 shifts to a low-level. To be more specific, the microcomputer 22 is provided with a low-level (the same level as when water does not enter into the terminals of the connector) input signal V1 via the down terminal 20. The microcomputer 22 determines that the lowering switch 14 is in a closed state based on the low-level input signal V1. The microcomputer 22 actuates the motor M to lower the window glass.

The power window apparatus 1 of the preferred embodiment has the advantages described below.

(1) When the operation switch 10 is not operated, the lowering switch 14 electrically connects the down terminal 16 and the battery terminal 17 to each other. This causes the microcomputer 22 to be provided with a high-level input signal V1. Further, the raising switch 15 electrically connects the up terminal 19 and the battery terminal 17 to each other. This causes the microcomputer 22 to be provided with a high-level input signal V2. When, for example, water enters into the connector of the power window apparatus 1, leakage current flows between the down terminal 16 and the ground terminal 18 via the leakage resistor RL1. Because the resistance of the leakage resistor RL1 is far greater than the resistance between the down terminal 16 and the battery terminal 17, the potential of the down terminal 16 is maintained at a high-level. Thus, the microcomputer 22 is provided with a high-level input signal V1, and does not actuate the motor M. In the same manner, in the raising switch 15, the potential of the up terminal 19 is maintained at a high-level. In this way, the microcomputer 22 is prevented from incorrectly recognizing the operation state of the operation switch 10 even when the power window apparatus 1 is submerged in water.

(2) The on-resistance of the lowering switch 14 in a closed state is far smaller than the resistance of a leakage resistor RL2. Thus, when the lowering switch 14 is closed, the potential level at the down terminal 16 shifts to a low-level even when water enters between terminals of the connector. To be more specific, the microcomputer 22 is provided with a low-level (the same level as when water does not enter between the terminals of the connector) input signal V1 via the down terminal 20. The microcomputer 22 determines that the lowering switch 14 is in a closed state based on the low-level input signal V1, and actuates the motor M to lower the window glass. In this way, the microcomputer 22 is prevented from incorrectly recognizing the operation state of the operation switch 10 even when the power window apparatus 1 is submerged in water. Thus, the window glass is raised or lowered according to the operation of the operation switch 10 performed by the operator.

(3) The lowering switch 14 and the raising switch 15 are each constructed by a transfer contact-type switch. In more detail, the lowering switch 14 includes the first switch unit 14a and the second switch unit 14b that operate in a manner complementary to each other. The raising switch 15 includes the third switch unit 15a and the fourth switch unit 15b that operate in a manner complementary to each other. With the use of such transfer contact-type switches, the power window apparatus 1 does not need to include an electric circuit for connecting either the battery terminal 17 or the ground terminal 18 to the down terminal 16, and an electric circuit for connecting either the battery terminal 17 or the ground terminal 18 to the up terminal 19. In this way, the structure of the power window apparatus 1 is simplified.

It should be apparent to those skilled in the art that the present invention may be embodied in many other specific forms without departing from the spirit or scope of the invention. Particularly, it should be understood that the present invention may be embodied in the following forms.

In the preferred embodiment, the operation switch 10 includes the lowering switch 14 and the raising switch 15 that are transfer contact-type switches. Instead of such a transfer contact-type switch, the operation switch 10 may include, for example, a relay for switching the connection between terminals. When, for example, the operation switch 10 is not operated, the relay may connect the battery terminal 17 to the down terminal 16. When, for example, the driver operates the operation switch 10 to lower the window glass, the relay may connect the ground terminal 18 to the down terminal 16. Alternatively, the operation switch 10 may include a semiconductor switch for switching the connection between terminals.

In the preferred embodiment, the microcomputer 22 drives the motor M in response to a low-level signal, based on the level of the input signals V1 and V2. However, the microcomputer of the power window apparatus may drive the motor M in response to a high-level signal, based on the level of the input signals V1 and V2.

A power window apparatus 30 including a microcomputer 36, which drives a motor M in response to a high-level signal, will now be described in detail with reference to FIGS. 7 and 8.

Figure 7:
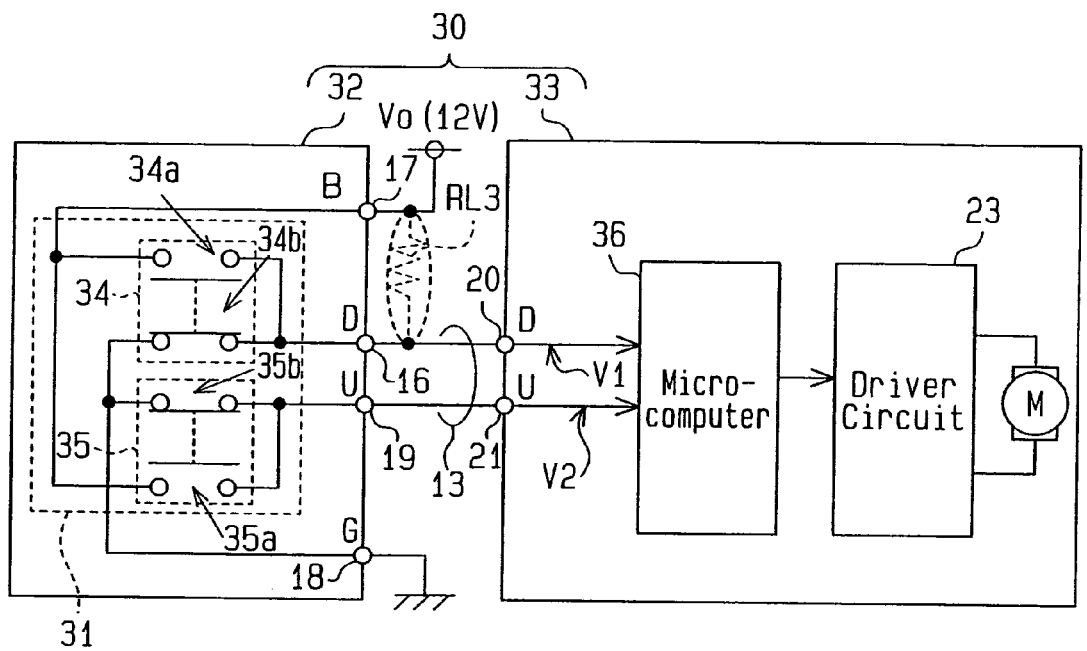
FIG. 7 is a schematic block diagram explaining the operation of a power window apparatus according to another embodiment of the present invention submerged in water.

As shown in FIG. 7, the power window apparatus 30 includes a switch device 32, which has an operation switch 31, and a motor controller 33, which has a waterproof structure.

The operation switch 31 includes a lowering switch 34 and a raising switch 35. The lowering switch 34 is a transfer contact-type switch connected between three terminals, namely, a down terminal 16, a battery terminal 17, and a ground terminal 18. The lowering switch 34 connects either the battery terminal 17 or the ground terminal 18 to the down terminal 16. In more detail, the lowering switch 34 includes a first switch unit 34a connected between the down terminal 16 and the battery terminal 17, and a second switch unit 34b connected between the down terminal 16 and the ground terminal 18. The first switch unit 34a and the second switch unit 34b operate in a manner complementary to each other. When the operation switch 31 is not operated, the second switch unit 34b is closed and the first switch unit 34a is opened. When, for example, the driver operates the operation switch 31 to lower a window glass, the first switch unit 34a is closed and the second switch unit 34b is opened. For ease of explanation, the state where the second switch unit 34b is closed is hereafter referred to as the lowering switch 34 is in an "opened state", and the state where the first switch unit 34a is closed is hereafter referred to as the lowering switch 34 is in a "closed state".

The raising switch 35 is a transfer contact-type switch connected between three terminals, namely, an up terminal 19, the battery terminal 17, and the ground terminal 18. The raising switch 35 connects either the battery terminal 17 or the ground terminal 18 to the up terminal 19. In more detail, the raising switch 35 includes a third switch unit 35a connected between the up terminal 19 and the battery terminal 17, and a fourth switch unit 35b connected between the up terminal 19 and the ground terminal 18. The third switch unit 35a and the fourth switch unit 35b operate in a manner complementary to each other. When the operation switch 31 is not operated, the fourth switch unit 35b is closed and the third switch unit 35a is opened. When, for example, the driver operates the operation switch 31 to raise the window glass, the third switch unit 35a is closed and the fourth switch unit 35b is opened. For ease of explanation, the state where the fourth switch unit 35b is closed is hereafter referred to as the raising switch 35 being in an "opened state", and the state where the third switch unit 35a is closed is hereafter referred to as the raising switch 35 being in a "closed state".

In the operation switch 31, either the lowering switch 34 or the raising switch 35 is closed by operating a button (not shown).

The motor controller 33 includes the microcomputer 36. The microcomputer 36 is connected to a down terminal 20 and an up terminal 21. The microcomputer 36 drives the motor M in response to a high-level signal, based on the level of input signals V1 and V2.

The following describes a case in which the vehicle having the power window apparatus 30 with the above-described structure is, for example, submerged in water. The lowering switch 34 and the raising switch 35 have the same structure, with the only difference being in the control executed by the microcomputer 36 (to raise or lower the window glass). The following only describes a case in which the operation switch 31 is operated to lower the window glass.

When the vehicle is submerged in water and water enters between the down terminal 16 and the battery terminal 17, leakage current flows between the down terminal 16 and the battery terminal 17. When the operation switch 31 is not operated (see FIG. 7), the second switch unit 34b of the lowering switch 34 is closed and the down terminal 16 is connected to the ground terminal 18. A voltage value of the down terminal 16 is obtained by dividing the voltage of a power supply Vo by a ratio of the resistance of a leakage resistor RL3 between the battery terminal 17 and the down terminal 16 to the resistance between the down terminal 16 and the ground terminal 18. Because the resistance of the leakage resistor RL3 is generally far greater than the resistance between the down terminal 16 and the ground terminal 18, the down terminal 16 is set at a low-level. Even at the time of water entry, therefore, the microcomputer 36 is provided with a low-level input signal V1 when the operation switch 31 is not operated. The microcomputer 36 determines that the lowering switch 34 is in an opened state and does not actuate the motor M.

Figure 8:
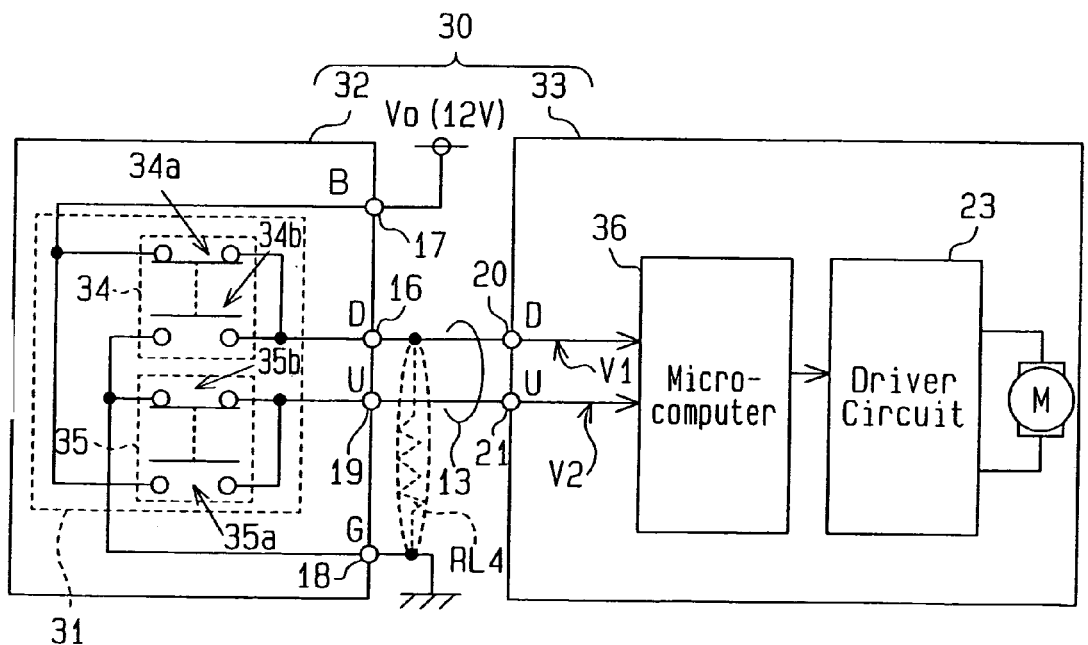
FIG. 8 is a schematic block diagram explaining the operation of the power window apparatus of FIG. 7 submerged in water.

As shown in FIG. 8, the lowering switch 34 is closed by operating the operation switch 31 at the time of water entry. In this case, because the on-resistance of the lowering switch 34 in a closed state is far smaller than the resistance of a leakage resistor RL4, the potential level at the down terminal 16 shifts to a high-level. The microcomputer 36 determines that the lowering switch 34 is in a closed state, and operates the motor M.

The power window apparatus 1 of the preferred embodiment may be applied, for example, to a housing. In this case, even when rainwater enters into the switch device 11, the microcomputer 22 is prevented from incorrectly recognizing the operation state of the operation switch 10.

The present examples and embodiments are to be considered as illustrative and not restrictive, and the invention is not to be limited to the details given herein, but may be modified within the scope and equivalence of the appended claims.

What is claimed is:

1. A power window apparatus for connection to a power supply and ground, for driving an actuator that is used to move a window glass, the power window apparatus comprising:
   a switch for causing the window glass to move when operated, wherein the switch generates a switch signal having a ground level when operated;
   a control unit for driving the actuator in response to the switch signal having the ground level;
   a connecting terminal used to connect the switch and the control unit to each other;
   a ground terminal used to connect the switch and ground to each other; and
   a power supply terminal used to connect the switch and the power supply to each other,
   wherein when operated, the switch connects the connecting terminal and the ground terminal to each other and generates the switch signal having the ground level in the connecting terminal, and when not operated, the switch connects the connecting terminal and the power supply terminal to each other.

2. The power window apparatus according to claim 1, wherein the switch includes a transfer contact-type switch connected between the connecting terminal, the power supply terminal, and the ground terminal.

3. The power window apparatus according to claim 1, wherein the switch includes:
   a first switch unit for selectively connecting the connecting terminal and the power supply terminal to each other; and
   a second switch unit for selectively connecting the connecting terminal and the ground terminal to each other in a manner complementary to the first switch unit.

4. A power window apparatus for connection to a power supply and ground, for driving an actuator that is used to raise and lower a widow glass, the power window apparatus comprising:
   a raising switch for causing the window glass to raise when operated, wherein the raising switch generates a first switch signal having a ground level when operated;
   a lowering switch for causing the window glass to lower when operated, wherein the lowering switch generates a second switch signal having a ground level when operated;
   a control unit for driving the actuator in response to the first switch signal or the second switch signal;
   a first terminal used to connect the raising switch and the control unit to each other;
   a second terminal used to connect the lowering switch and the control unit to each other;
   a ground terminal used to connect the raising switch and the lowering switch to ground; and
   a power supply terminal used to connect the raising switch and the lowering switch to the power supply,
   wherein when operated, the raising switch connects the first terminal and the ground terminal to each other and generates the first switch signal having the ground level in the first terminal, and when not operated, the raising switch connects the first terminal and the power supply terminal to each other, and
   wherein when operated, the lowering switch connects the second terminal and the ground terminal to each other and generates the second switch signal having the ground level in the second terminal, and when not operated, the lowering switch connects the second terminal and the power supply terminal to each other.

5. The power window apparatus according to claim 4, wherein at least one of the lowering switch and the raising switch includes a transfer contact-type switch.

6. A method for maintaining a switch signal generated by a switch at a ground level or a power supply level in a power window apparatus that includes the switch, which causes a window glass to move when operated, the power window apparatus including a control unit for driving an actuator to move the window glass in response to a switch signal having a ground level, a connecting terminal connected to the control unit, a ground terminal connected to the ground, and a power supply terminal connected to a power supply, the method comprising:

connecting the connecting terminal and the ground terminal to each other and generating a switch signal having the ground level in the connecting terminal when the switch is operated; and connecting the connecting terminal and the power supply terminal to each other and generating a switch signal having the power supply level in the connecting terminal when the switch is not operated.

* * * * *